US 010531505B2

(12) United States Patent
Gagne

(10) Patent No.: US 10,531,505 B2
(45) Date of Patent: Jan. 7, 2020

(54) COMMUNICATING WITH UNMANNED AERIAL VEHICLES AND AIR TRAFFIC CONTROL

(71) Applicant: ATC Technologies, LLC, Reston, VA (US)

(72) Inventor: Michael Gagne, Reston, VA (US)

(73) Assignee: ATC TECHNOLOGIES, LLC, Reston, VA (US)

( * ) Notice: Subject to any disclaimer, the term of this patent is extended or adjusted under 35 U.S.C. 154(b) by 0 days.

(21) Appl. No.: 15/954,001

(22) Filed: Apr. 16, 2018

(65) Prior Publication Data
US 2018/0324881 A1 Nov. 8, 2018

Related U.S. Application Data

(60) Provisional application No. 62/502,112, filed on May 5, 2017.

(51) Int. Cl.
H04W 4/10 (2009.01)
B64C 39/00 (2006.01)
(Continued)

(52) U.S. Cl.
CPC ............. H04W 76/14 (2018.02); G01S 19/07 (2013.01); G05D 1/0022 (2013.01);
(Continued)

(58) Field of Classification Search
CPC ............ H04B 7/18502; H04B 7/18504; H04B 7/18506; H04B 7/18508; H04B 7/155;
(Continued)

(56) References Cited

U.S. PATENT DOCUMENTS 9,542,850 B2 1/2017 Kantor et al.
2016/0274241 A1* 9/2016 Gentry ................... G01C 21/00
(Continued)

FOREIGN PATENT DOCUMENTS

KR 101644 8/2016
WO 2016075686 5/2016
(Continued)

OTHER PUBLICATIONS

European Patent Application No. 18167564.6 partial European search report dated Sep. 25, 2018 (16 pages).

Primary Examiner — Philip Sobutka
(74) Attorney, Agent, or Firm — Michael Best & Friedrich LLP

(57) ABSTRACT

The present disclosure includes devices, systems, and methods for communicating with unmanned aerial vehicles. In one embodiment, the present disclosure includes a server including a communication interface, a memory, and an electronic processor communicatively connected to the memory. The electronic processor is configured to communicate with one or more unmanned aerial vehicles via the communication interface and a satellite network, communicate with the one or more unmanned aerial vehicles via the communication interface and a terrestrial network, and communicate with the one or more unmanned aerial vehicles via the communication interface and a combination of the satellite network and the terrestrial network.

15 Claims, 10 Drawing Sheets

(51) Int. Cl.
*H04B 7/155* (2006.01)
*H04W 76/14* (2018.01)
*H04W 4/02* (2018.01)
*G05D 1/00* (2006.01)
*G01S 19/07* (2010.01)
*G05D 1/02* (2006.01)
*H04W 84/06* (2009.01)
*H04W 84/12* (2009.01)

(52) U.S. Cl.
CPC .......... *G05D 1/0202* (2013.01); *H04W 4/023* (2013.01); *H04W 4/10* (2013.01); *H04W 84/06* (2013.01); *H04W 84/12* (2013.01)

(58) Field of Classification Search
CPC ........ H04B 7/185; H04W 4/023; H04W 4/10; H04W 76/14; H04W 84/06; H04W 84/12; H04W 4/02; H04W 4/024; H04W 4/026; H04W 4/025; H04W 4/027; H04W 4/40; H04W 4/44; H04W 4/046; H04W 64/003; G01S 19/07; G01S 19/41; G05D 1/0022; G05D 1/0202; G06Q 10/083; G08G 5/00; G08G 5/0004; G08G 5/0013; G08G 5/025; G08G 5/0026; G08G 5/0034; G08G 5/0039; G08G 5/0043; G08G 5/0056; G08G 5/006; G08G 5/0069; G08G 5/0082; G08G 5/0086; G08G 5/0091; G08G 5/0095; H04L 61/2007; H04L 61/6022; B64C 39/024; B64C 2201/146; B64C 2201/145
USPC ..... 455/420, 431, 427, 11.1, 12.1, 517, 518, 455/519, 520
See application file for complete search history.

(56) References Cited

U.S. PATENT DOCUMENTS

2016/0300495 A1* 10/2016 Kantor ................. G08G 5/0039
2017/0215220 A1* 7/2017 Kim ..................... H04W 16/14

FOREIGN PATENT DOCUMENTS

WO 2016148989 9/2016
WO 2016161637 10/2016

* cited by examiner

COMMUNICATING WITH UNMANNED AERIAL VEHICLES AND AIR TRAFFIC CONTROL

FIELD OF THE INVENTION

The present disclosure relates generally to unmanned aerial systems. More specifically, the present disclosure relates to unmanned aerial systems including a private enterprise network with an unmanned aerial system platform for communication with, and control of, one or more unmanned aerial vehicles via a satellite network and/or a terrestrial network.

SUMMARY

Conventionally, an unmanned aerial system may include a private enterprise core with an unmanned aerial system platform that is limited to communication with and control of an unmanned aerial vehicle via a satellite network or a local area network. However, unmanned aerial systems of the present disclosure are not limited to a satellite network or a local area network, but instead, in some embodiments, the unmanned aerial systems of the present disclosure may communicate with and control one or more unmanned aerial vehicles via a satellite network, a local area network, a terrestrial network (for example, a private terrestrial network or a third-party existing cellular network), or some combination thereof. In other embodiments, unmanned aerial systems of the present disclosure are also capable of communicating high precision location information for each of the one or more unmanned aerial vehicles.

Unmanned aerial systems of the present disclosure are also capable of providing push-to-talk communication between Air Traffic Control (ATC) towers and relevant user(s) operating the one or more unmanned aerial vehicles. Further, in some embodiments, unmanned aerial systems of the present disclosure may communicate information, including peer-to-peer messages, to a plurality of unmanned aerial vehicles via a peer-to-peer communication link between the plurality of unmanned aerial vehicles. In at least one exemplary embodiment, the plurality of unmanned aerial vehicles includes the one or more unmanned aerial vehicles and at least one unmanned aerial vehicle that is separate from the one or more unmanned aerial vehicles.

In one embodiment, the present disclosure includes a server including a communication interface, a memory, and an electronic processor communicatively connected to the memory and the communication interface. The electronic processor is configured to communicate with one or more unmanned aerial vehicles via the communication interface and a satellite network, communicate with the one or more unmanned aerial vehicles via the communication interface and a terrestrial network, and communicate with the one or more unmanned aerial vehicles via the communication interface and a combination of the satellite network and the terrestrial network.

In another embodiment, the present disclosure includes a system including one or more unmanned aerial vehicles, and a server. The server includes a communication interface, a memory, and an electronic processor communicatively connected to the memory and the communication interface. The electronic processor is configured to communicate with the one or more unmanned aerial vehicles via the communication interface and a satellite network, communicate with the one or more unmanned aerial vehicles via the communication interface and a terrestrial network, and communicate with the one or more unmanned aerial vehicles via the communication interface and a combination of the satellite network and the terrestrial network.

In yet another embodiment, the present disclosure includes a method. The method includes generating, with an electronic processor, a correction vector based on a current positioning error in GPS signals of a plurality of high precision reference stations. The method also includes controlling, with the electronic processor, a communication interface to transmit the correction vector to one or more unmanned aerial vehicles via a combination of a satellite network and a terrestrial network.

DETAILED DESCRIPTION

Before any embodiments of the present disclosure are explained in detail, it is to be understood that the present disclosure is not limited in its application to the details of construction and the arrangement of components set forth in the following description or illustrated in the following drawings. The present disclosure is capable of other embodiments and of being practiced or of being carried out in various ways.

Figure 1:
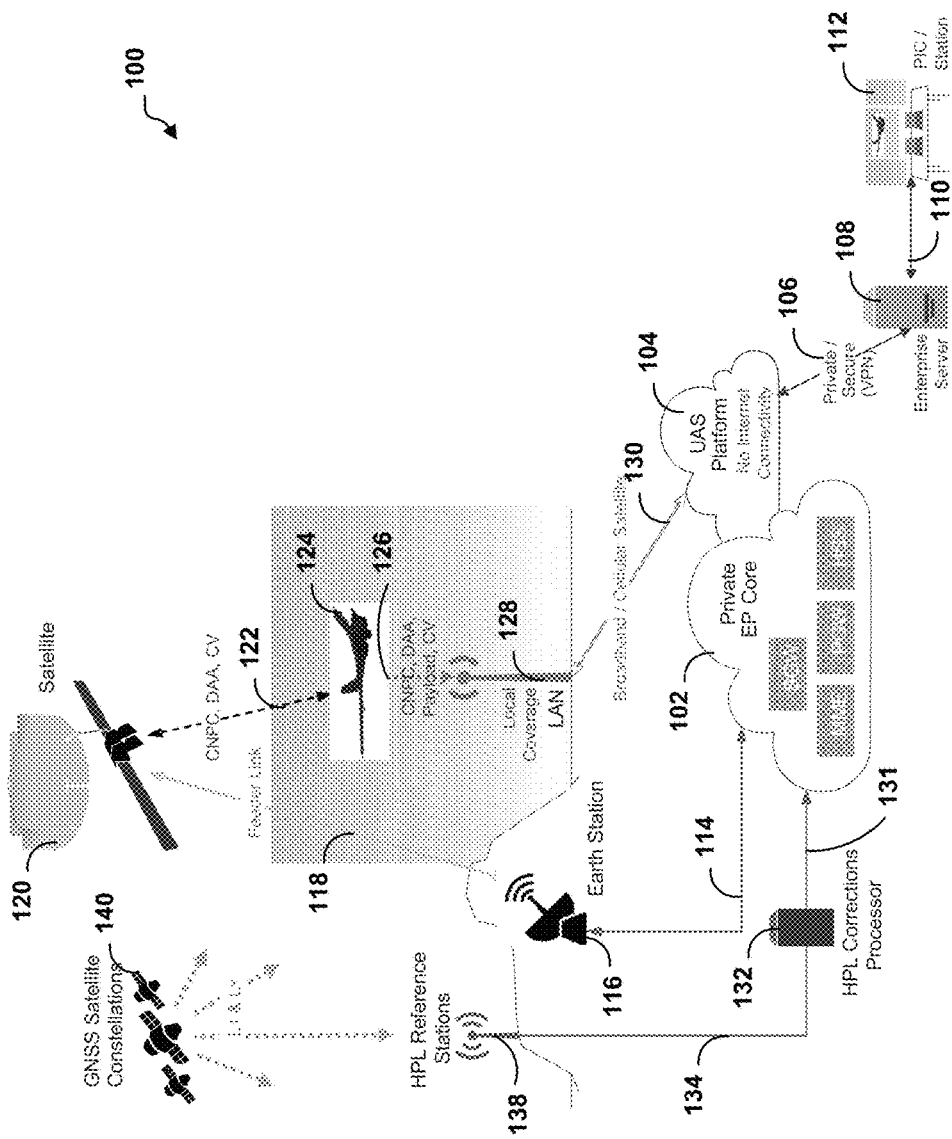
FIG. 1 is a diagram illustrating an unmanned aerial system (UAS) including high precision location reference stations, in accordance with some embodiments.

FIG. 1 is a diagram illustrating an unmanned aerial system (UAS) 100 including high precision location (HPL) reference stations 138, in accordance with some embodiments. In the example of FIG. 1, the UAS 100 includes private enterprise (EP) core 102 with a UAS platform 104, an enterprise server 108, a PIC/Station 112, an earth station 116, a satellite 120, a unmanned aerial vehicle 124, a local area network (LAN) antenna 128, a HPL corrections processor 132, the HPL reference stations 138, and a global navigation satellite system (GNSS) constellation 140.

The private EP core 102 is a private network that operates on one or more private servers are described in greater detail below. The private EP core 102 in addition to the UAS platform 104 also includes several services, for example, Serving Gateway (SGW) service, Mobility Management Entity (MME) service, evolved Packet Data Gateway (ePDG) service, and Home Subscriber service (HSS). The services provided by the private EP core 102 are illustrated in FIG. 1; however, the private EP core 102 may include fewer or additional services. The UAS platform 104 is configured to record all passed messages, perform performance reporting, and store all payload data.

The private EP core 102 is communicatively connected to the enterprise server 108 via a bi-directional communication link 106 (for example, a wireless communication link or a wired communication link). As illustrated in FIG. 1, the bi-directional communication link 106 is a private and secure communication link, for example, a communication link over a virtual private network (VPN). The private EP core 102 and the UAS platform 104 have no direct access to the internet. In some example, connectivity to the private EP core 102 and the UAS platform 104 is only achieved through secure Virtual Private Network (VPN) or Access Point Name (APN).

The enterprise server 108 communicates with the PIC/Station 112 over a bi-directional communication link 110. The PIC/Station 112 includes user control interfaces and one or more displays that a user may use to control one or more unmanned aerial vehicles, for example, the unmanned aerial vehicle 124. The user control interfaces may include one or more of a mouse, a keyboard, a joystick, or other suitable user control interface.

The enterprise server 108 receives payload, video, and telemetry information from the UAS platform 104 and provides the payload, video, and telemetry information to a user. The user may use the control interfaces of the PIC/Station 112 to control the unmanned aerial vehicle 124 and the PIC/Station 112 transmits the control information to the UAS platform 104 through the enterprise server 108.

The private EP core 102 is also communicatively connected to the earth station 116 via a bi-directional communication link 114 (for example, a wireless communication link or a wired communication link). In some embodiments, the bi-directional communication link 114 is a private and secure communication link, for example, a communication link over a virtual private network (VPN).

The earth station 116 is a satellite antenna, a hub defining an air interface, and ground-based beamforming that sends information (for example, control non-payload command information (CNPC), detect and avoid information (DAA), and high precision location information (HPL)) from the private EP core 102, and in particular, the UAS platform 104, and receives video and telemetry information from the satellite 120 via a feeder link 118. The earth station 116 transmits the video, telemetry, DAA, and other payload information to the private EP core 102 from the satellite 120 over the bi-directional communication link 114. In some examples, the bi-directional communication link 114 is secured by Advanced Encryption Standard (AES) 256 bit encryption. In some examples, the earth station 116 is FIPS 140-2 Compliant. In other examples, the earth station 116 performs an anti-spoofing and anti jamming technique using angle of arrival. For example, the anti-spoofing may be accomplished by utilizing angle of arrival of satellite reception at the unmanned vehicle from a known geosynchronous satellite location.

The satellite 120 receives the information from the private EP core 102 from the earth station 116 via the feeder link 118. The satellite 120 creates a satellite network and transmits the information to the unmanned aerial vehicle 124 via a bi-directional satellite communication link 122. In some embodiments, the bi-directional satellite communication link 122 is unicast, multicast, broadcast, or a combination thereof. The satellite 120 may provide primary or redundant CNPC information, DAA information, geo-fencing information, weather information, or other suitable information. The satellite 120 is also in continuous communication with the unmanned aerial vehicle 124 during the mission of the unmanned aerial vehicle 124.

The private EP core 102 is also communicatively connected to the local area network (LAN) antenna 128 via a bi-directional communication link 130 (for example, a wireless communication link or a wired communication link). As illustrated in FIG. 1, the bi-directional communication link 130 may be a broadband communication link, a cellular communication link, a satellite communication link, or a combination thereof.

The LAN antenna 128 creates a local area network 126 that sends information (for example, payload information, control non-payload commands information (CNPC), detect and avoid (DAA) information, and high precision location information (HPL)) from the private EP core 102, and in particular, the UAS platform 104 to the unmanned aerial vehicle 123 via the local area network 126. The LAN antenna 128 also receives video and telemetry information from the unmanned aerial vehicle 124 via the local area network 126. The LAN antenna 128 transmits the video and telemetry information to the private EP core 102 from the unmanned aerial vehicle 124 over the bi-directional communication link 130. In some examples, the LAN antenna 128 may be a local ground station using either licensed or unlicensed spectrum as permitted by the Federal Aviation Administration (FAA) for visual line of sight (VLOS) operations.

As illustrated in FIG. 1, the private EP core 102 is also communicatively connected to the HPL corrections processor 132 via a unidirectional communication link 131 (for example, a wireless communication link or a wired communication link). As illustrated in FIG. 1, the HPL corrections processor 132 is external to the private EP core 102. However, in some embodiments, the HPL corrections processor 132 is located within the private EP core 102 (see FIG. 8).

The HPL corrections processor 132 receives high precision location information from a plurality of HPL reference stations 138 via a unidirectional communication link 134 (for example, a wireless communication link or a wired communication link). The plurality of HPL reference stations 138 may be deployed on each continent to meet accuracy and performance metrics, including North America. In some embodiments, the unidirectional communication links 131 and/or 134 may be a broadband communication link, a cellular communication link, a satellite communication link, a plain old telephone service (POTS) communication link, or a combination thereof.

Each of the plurality of HPL reference stations 138 is positioned at a precise geographical location. The precision of the geographical location is within a few millimeters. The HPL reference stations 138 receive global position system (GPS) signals from the GNSS satellite constellation 140. Each of the plurality of HPL reference stations 138 transmits to the HPL corrections processor 132 observable data with respect to the received GPS signals, the said observable data being referred to as Observables. The HPL corrections processor 132 processes the Observables from the plurality of HPL reference stations 138, using a processing algorithm, to determine a set of corrections (referred to as a "correction vector" or "CV") that is used by the unmanned aerial vehicle to generate a precise location estimation (also referred to as high-precision location (HPL) information) based on its own received GPS signals. The HPL corrections processor 132 transmits the correction vector to the private EP core 102 via the unidirectional communication link 131. The correction vector is a dynamic parameter that is affected by the constant changes in the Earth's atmosphere.

The private EP core 102 receives the correction vector from the HPL corrections processor 132 and transmits the correction vector to the unmanned aerial vehicle 124. For ease of understanding, a single unmanned aerial vehicle, i.e., the unmanned aerial vehicle 124 is illustrated in FIG. 1. However, the private EP core 102 may transmit the correction vector to any number of other unmanned aerial vehicles that are communicatively connected to the private EP core 102 via the satellite 120 and/or the local area network antenna 128. The unmanned aerial vehicle 124 includes hardware (see FIG. 9) that receives GPS signals from the GNSS satellite constellation 140, receives the correction vector from the private EP core 102, and processes the GPS signals using the correction vector to generate HPL information that is accurate to within a ten centimeters. In this instance, the private EP core 102 acts as a pass-through and relays the correction vector from the HPL corrections processor 132 to the unmanned aerial vehicle 124 via the satellite 120 and the LAN antenna 128. Alternatively, in some embodiments, the private EP core 102 may include the HPL corrections processor 132. In this instance, the private EP core 102 may receive the GPS signals from the plurality of HPL reference stations 138, generate the correction vector, and transmit the correction vector the unmanned aerial vehicle 124 via the satellite 120 and the LAN antenna 128.

Additionally or alternatively, in some embodiments, the private EP core 102 receives the correction vector from the HPL corrections processor 132 and the GPS signals from the unmanned aerial vehicle 124, and processes the GPS signals using the correction vector to generate HPL information of the unmanned aerial vehicle 124 that is accurate to within ten centimeters. For example, the private EP core 102 receives the correction vector and the GPS signals from the unmanned aerial vehicle 124 in parallel.

Advantages of the UAS 100 with the HPL information include providing high resolution location for Pilot, Air Traffic Control (ATC), Flight Services, Unmanned Traffic Control (UTM), and various applications related to the payload of the unmanned aerial vehicle such a imagery, surveying, and inspections. The HPL information may improve accuracy in geo-fencing applications. As illustrated in FIG. 1, the correction vector is delivered by satellite and terrestrial networks. In some embodiments, a location of the unmanned aerial vehicle 124 is determined to within ten centimeters. In further embodiments, the private EP core 102 randomly validates the communication links of the UAS 100.

Figure 2:
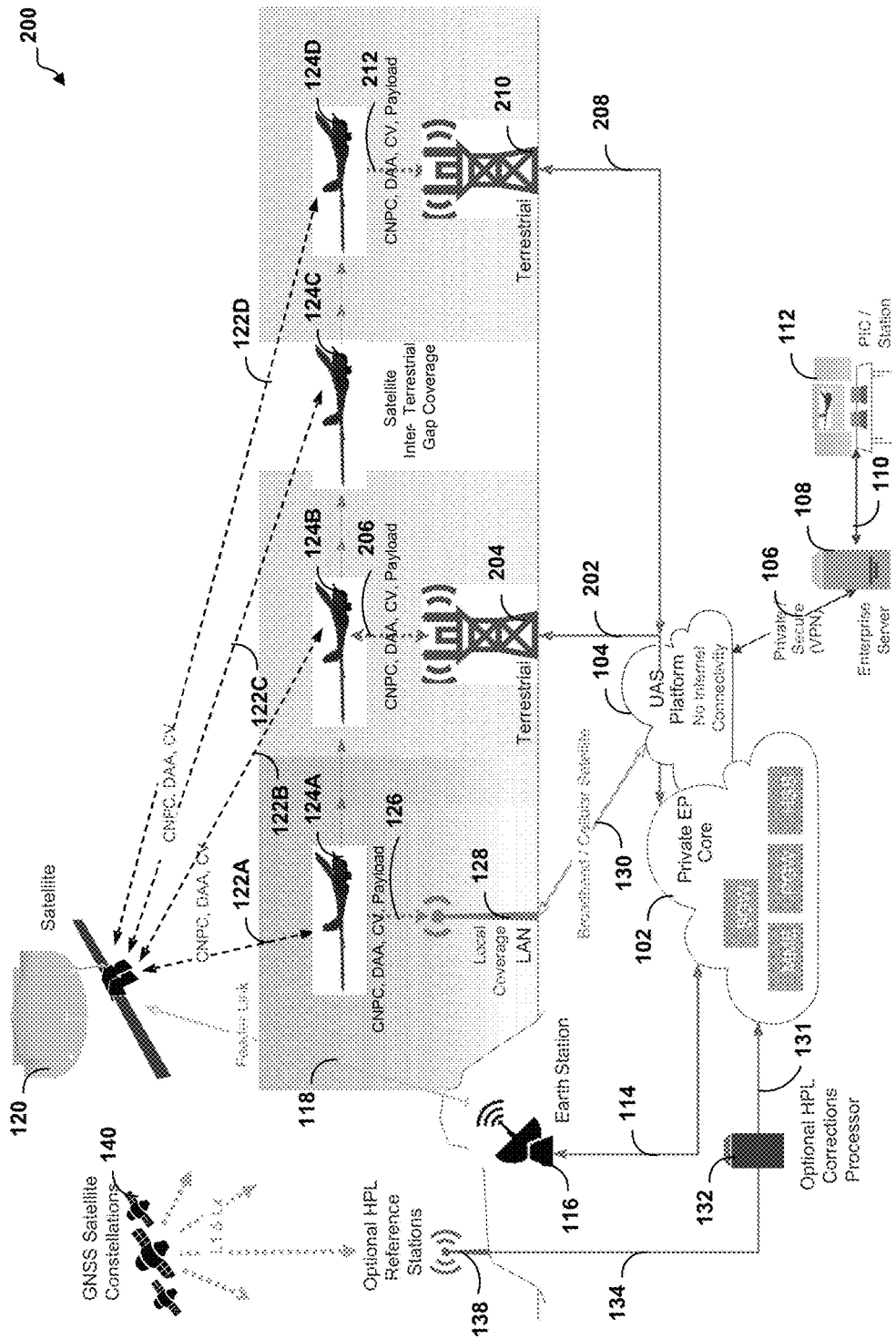
FIG. 2 is a diagram illustrating an unmanned aerial system (UAS) including a satellite network and a terrestrial network, in accordance with some embodiments.

FIG. 2 is a diagram illustrating an unmanned aerial system (UAS) 200 including a satellite network 120 and a terrestrial network 206 and 212, in accordance with some embodiments. The UAS 100 and UAS 200 have similar components and function similarly. Therefore, the description of the UAS 100 is a description that may be applied to the UAS 200. As a consequence, the components and functionality previously described above with respect to the UAS 100 are not described in greater detail. As illustrated in FIG. 2, the UAS 200 optionally includes the HPL corrections processor 132 and the HPL reference stations 138.

In the example of FIG. 2, the UAS 200 includes terrestrial antennas 204 and 210. The private EP core 102 is communicatively connected to the terrestrial antennas 204 and 210 via bi-directional communication links 202 and 208, respectively. The terrestrial antennas 204 and 210 create terrestrial networks 206 and 212.

As illustrated in FIG. 2, the unmanned aerial vehicle 124 in a first location (illustrated and referred to as "the unmanned aerial vehicle 124A"). The unmanned aerial vehicle 124A is connected to the private EP core 102 via a satellite bi-directional communication link 122A (similar to the satellite bi-directional communication link 122) and the local area network 126. The unmanned aerial vehicle 124A receives information in the manner as described above with respect to FIG. 1.

The unmanned aerial vehicle 124 in a second location different from the first location and along a flight path (illustrated and referred to as "the unmanned aerial vehicle 124B"). The unmanned aerial vehicle 124B is connected to the private EP core 102 via a satellite bi-directional communication link 122B (similar to the satellite bi-directional communication link 122) and the terrestrial network 206. The unmanned aerial vehicle 124B receives CNPC, DAA, and the correction vector from the satellite 120 and the terrestrial antenna 204. Additionally, the unmanned aerial vehicle 124B also receives payload information from the terrestrial antenna 204.

The unmanned aerial vehicle 124 in a third location different from the first and second locations along the flight path (illustrated and referred to as "the unmanned aerial vehicle 124C"). As illustrated in FIG. 2, the unmanned aerial vehicle 124C is in an inter-terrestrial gap coverage that does not have local area network coverage or terrestrial network coverage. The unmanned aerial vehicle 124C is still connected to the private EP core 102 via a satellite bi-directional communication link 122C (similar to the satellite bi-directional communication link 122).

The unmanned aerial vehicle 124 in a fourth location different from the first, second, and third locations and along the flight path (illustrated and referred to as "the unmanned aerial vehicle 124D"). The unmanned aerial vehicle 124D is connected to the private EP core 102 via a satellite bi-directional communication link 122D (similar to the satellite bi-directional communication link 122) and the terrestrial network 212. The unmanned aerial vehicle 124D receives CNPC, DAA, and correction vector from the satellite 120 and the terrestrial antenna 210. Additionally, the unmanned aerial vehicle 124D also receives payload information from the terrestrial antenna 210.

Advantages of the UAS 200 include, among other things, satellite and terrestrial connectivity when the unmanned aerial vehicle is within coverage. Stated differently, the terrestrial network provides coverage and capacity augmentation to the satellite network for the UAS 200. The terrestrial network may also be designed for mission operation by providing high capacity, low latency, high bandwidth, and highly secure, as well as redundancy for CNPC, DAA, and the correction vector. The satellite network provides pervasive coverage for the unmanned aerial vehicle that is within an inter-terrestrial coverage gap and session continuity.

Figure 3:
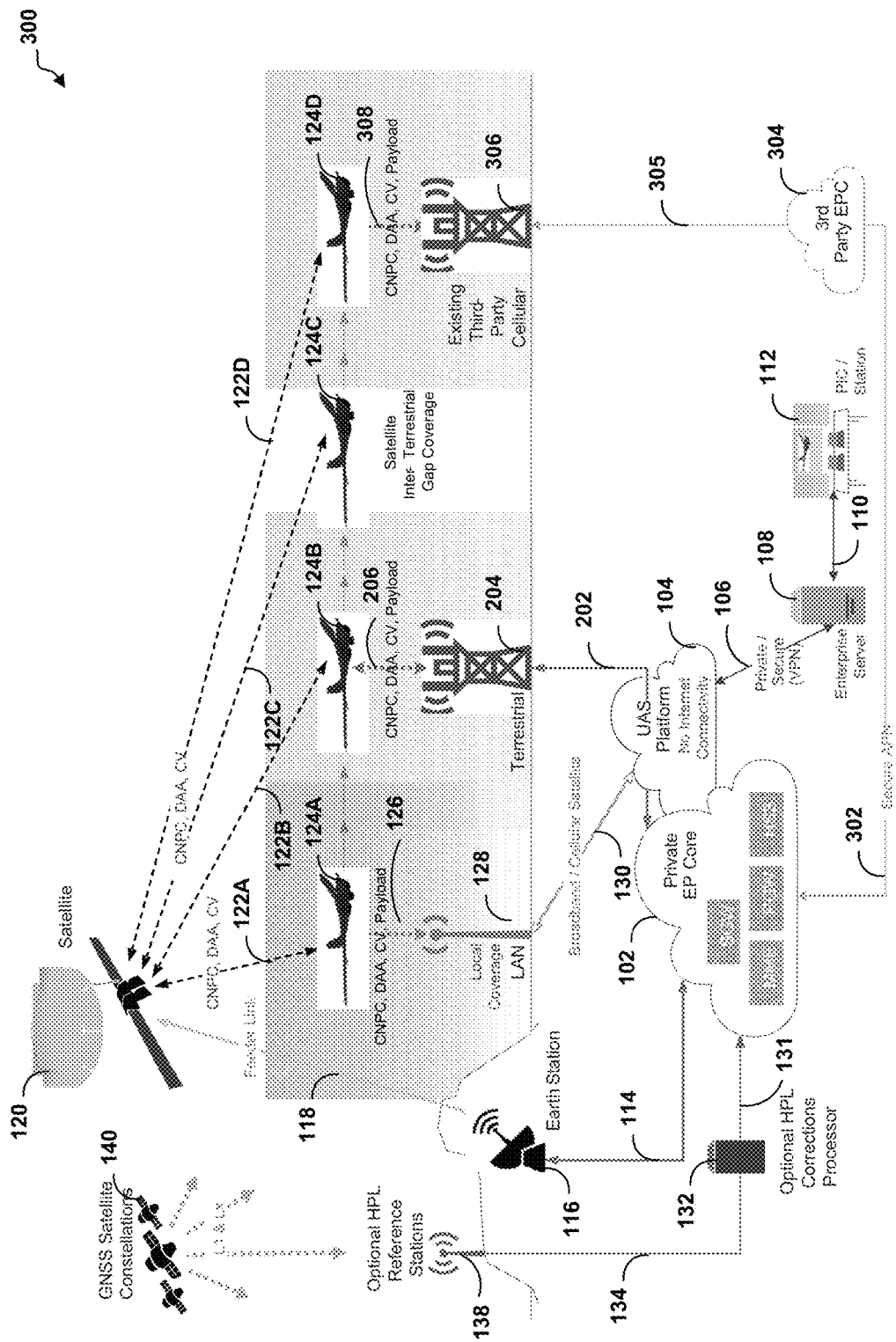
FIG. 3 is a diagram illustrating an unmanned aerial system (UAS) including a satellite network and a terrestrial network using existing third-party cellular communications, in accordance with some embodiments.

FIG. 3 is a diagram illustrating an unmanned aerial system (UAS) 300 including a satellite network 120 and a terrestrial network using existing third-party cellular communications, in accordance with some embodiments. The UASs 100 through 300 have similar components and function similarly. Therefore, the description of the UAS 100 and the UAS 200 is a description that may be applied to the UAS 300. As a consequence, the components and functionality previously described above with respect to the UASs 100 and 200 are not described in greater detail. As illustrated in FIG. 3, the UAS 300 optionally includes the HPL corrections processor 132 and the HPL reference stations 138.

The UAS 300 may replace or augment the terrestrial network 212 with an existing third-party cellular network 308. For ease of understanding, FIG. 3 illustrates replacing the terrestrial network 212 with the existing third-party network 308. However, FIG. 3 should also be understood to illustrate the augmentation of the terrestrial networks 206 and 212.

The private EP core 102 is communicatively connected to a third-party enterprise core (EPC) 304 via a bi-directional communication link 302. As illustrated in FIG. 3, the bi-directional communication link 302 is a secure access point name (APN) and provides a secure connection between the private EP core 102 and the third-party EPC 304. The third-party EP core 304 may be a private or non-private network of a third-party cellular communication provider that provides the existing third-party cellular network 308 with a cellular antenna 306 that is communicatively connected to the third-party EPC 304 via a bi-directional communication link 305. The bi-directional communication links 302 and 305 may be similar to the bi-directional communication links 106, 110, 114, and 202 as described above, and therefore, are not described in greater detail.

As illustrated in FIG. 3, the unmanned aerial vehicle 124D is connected to the private EP core 102 via a satellite bi-directional communication link 122D (similar to the satellite bi-directional communication link 122) and the existing third-party cellular network 308. The unmanned aerial vehicle 124D receives CNPC, DAA, and the correction vector from the satellite 120 and the existing third-party cellular antenna 306. Additionally, the unmanned aerial vehicle 124D also receives payload information from the existing third-party cellular antenna 306.

Advantages of the UAS 300 include, among other things, satellite and terrestrial connectivity when the unmanned aerial vehicle is within coverage. The coverage includes existing coverage and spectrum assets of existing third-party cellular communication providers. Another advantage is the leveraging of existing cellular infrastructure. Yet another advantage of the UAS 300 is secure connectivity between the core networks.

Figure 4:
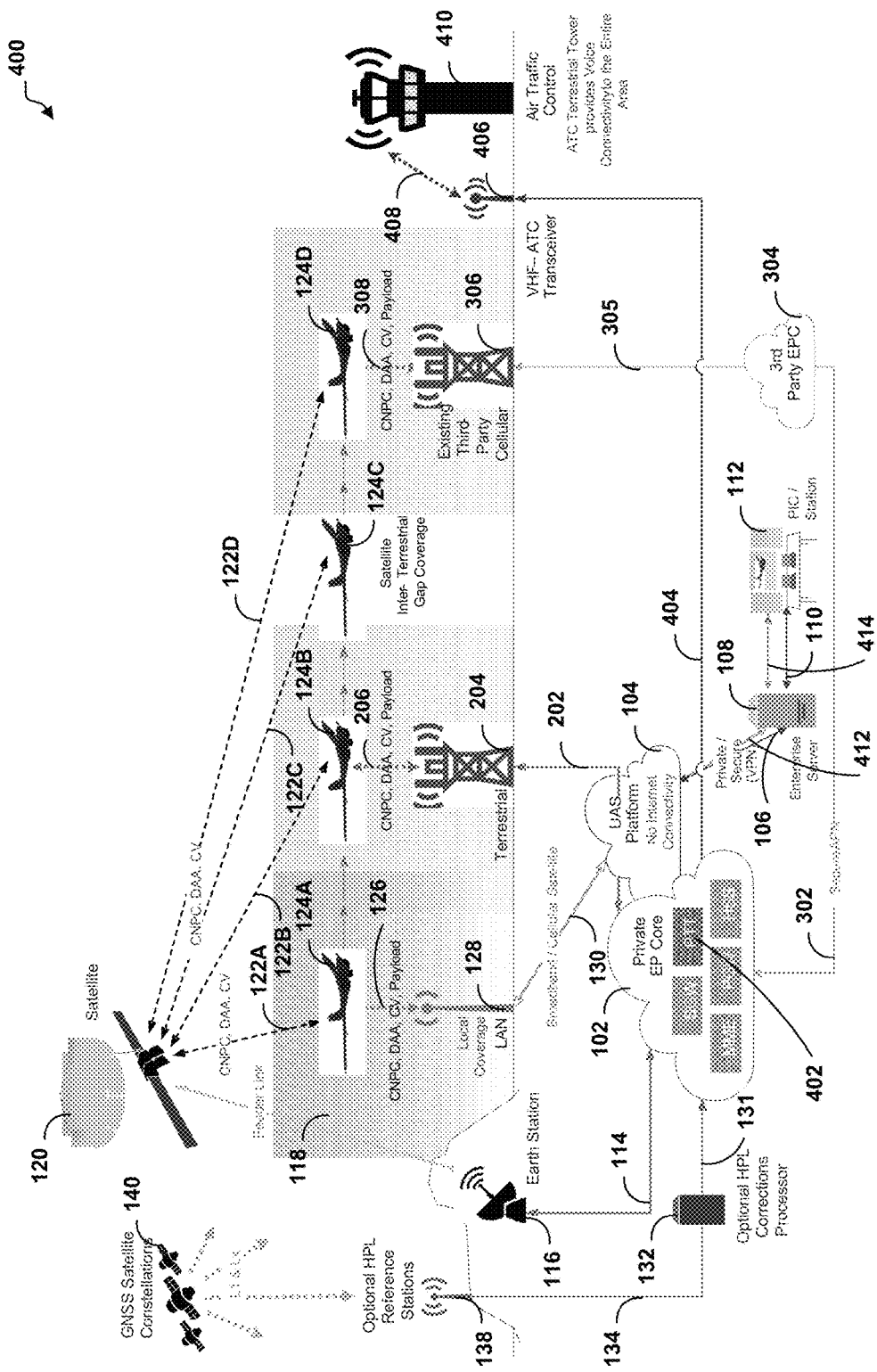
FIG. 4 is a diagram illustrating an unmanned aerial system (UAS) including a VHF-ATC transceiver for communication with an Air Traffic Control (ATC) terrestrial tower, in accordance with some embodiments.

FIG. 4 is a diagram illustrating an unmanned aerial system (UAS) 400 including a VHF-ATC transceiver 406 for communication with an Air Traffic Control (ATC) terrestrial tower 410, in accordance with some embodiments. The UASs 100 through 400 have similar components and function similarly. Therefore, the description of the UASs 100, 200, and 300 is a description that may be applied to the UAS 400. As a consequence, the components and functionality previously described above with respect to the UASs 100 through 300 are not described in greater detail. As illustrated in FIG. 4, the UAS 400 optionally includes the HPL corrections processor 132 and the HPL reference stations 138.

In the example of FIG. 4, the private EP core 102 also includes a push-to-talk service 402 that is available to the user of the PIC/Station 112. The push-to-talk service 402 is communicatively connected to the VHF-ATC transceiver 406 via bi-directional communication link 404 and the enterprise server 108 via bi-directional communication link 412. In some embodiments, the enterprise server 108 has a second bi-directional communication link 414 with the PIC/Station 112 to send and receive voice information to and from the user. In this instance, the PIC/Station 112 further includes a speaker and the user control interfaces as described above with respect to FIG. 1, further include a user-controlled microphone.

As illustrated in FIG. 4, the ATC terrestrial tower 410 transmits a voice communication to the unmanned aerial vehicle 124 (for example, the unmanned aerial vehicle 124D). However, the VHF-ATC transceiver 406 is located within the transmission range of the ATC terrestrial tower 410 and receives the voice communication over wireless bi-directional communication link 408. The VHF-ATC transceiver 406 transmits the voice communication to the push-to-talk service 402 of the private EP core 102. The private EP core 102 determines which unmanned aerial vehicles are located within range of the ATC terrestrial tower 410 by geo-fencing the unmanned aerial vehicle 124 using positioning information (for example, the high precision location information generated by the private EP core 102) and the VHF-ATC transceiver 406 or the ATC terrestrial tower 410. The push-to-talk service 402 relays the voice communication to the unmanned aerial vehicle 124 that is determined to be within range of the ATC terrestrial tower 410.

To relay the voice communication to the unmanned aerial vehicle 124 that is determined to be within range of the proper ATC terrestrial tower 410, the UAS platform 104 transmits the voice communication to the enterprise server 108 via the bi-directional communication link 412. The enterprise server 108 transmits the voice communication to PIC/Station 112 and the user via the bi-directional communication link 414.

The user may respond to the voice communication at the PIC/Station 112 to transmit a second communication (for example, a second voice communication) to the enterprise server 108 over the bi-directional communication link 414. The enterprise server 108 transmits the second communication to the UAS platform 104 via the bi-directional communication link 412. The push-to-talk service 402 receives the second communication from the UAS platform 104 and relays the second communication to the VHF-ATC transceiver 406 via the bi-directional communication link 404. The VHF-ATC transceiver 406 broadcasts the second communication to the ATC terrestrial tower via the wireless bi-directional communication link 408.

For ease of understanding, FIG. 4 illustrates and describes a single VHF-ATC transceiver 406 and a single ATC terrestrial tower 410. However, the one-to-one correspondence may be applied to every ATC terrestrial tower in North America. For example, each ATC terrestrial tower (including the ATC terrestrial tower 410) in North America may have a corresponding one of a plurality of VHF-ATC transceivers (including the VHF-ATC transceiver 406) located within the transmission range (i.e., coverage area) of the respective ATC terrestrial tower. The UAS platform 104 may also relay the voice communication to one or more enterprise servers that are operating one or more unmanned aerial vehicles that are determined to be within range of the ATC terrestrial tower.

Figure 5:
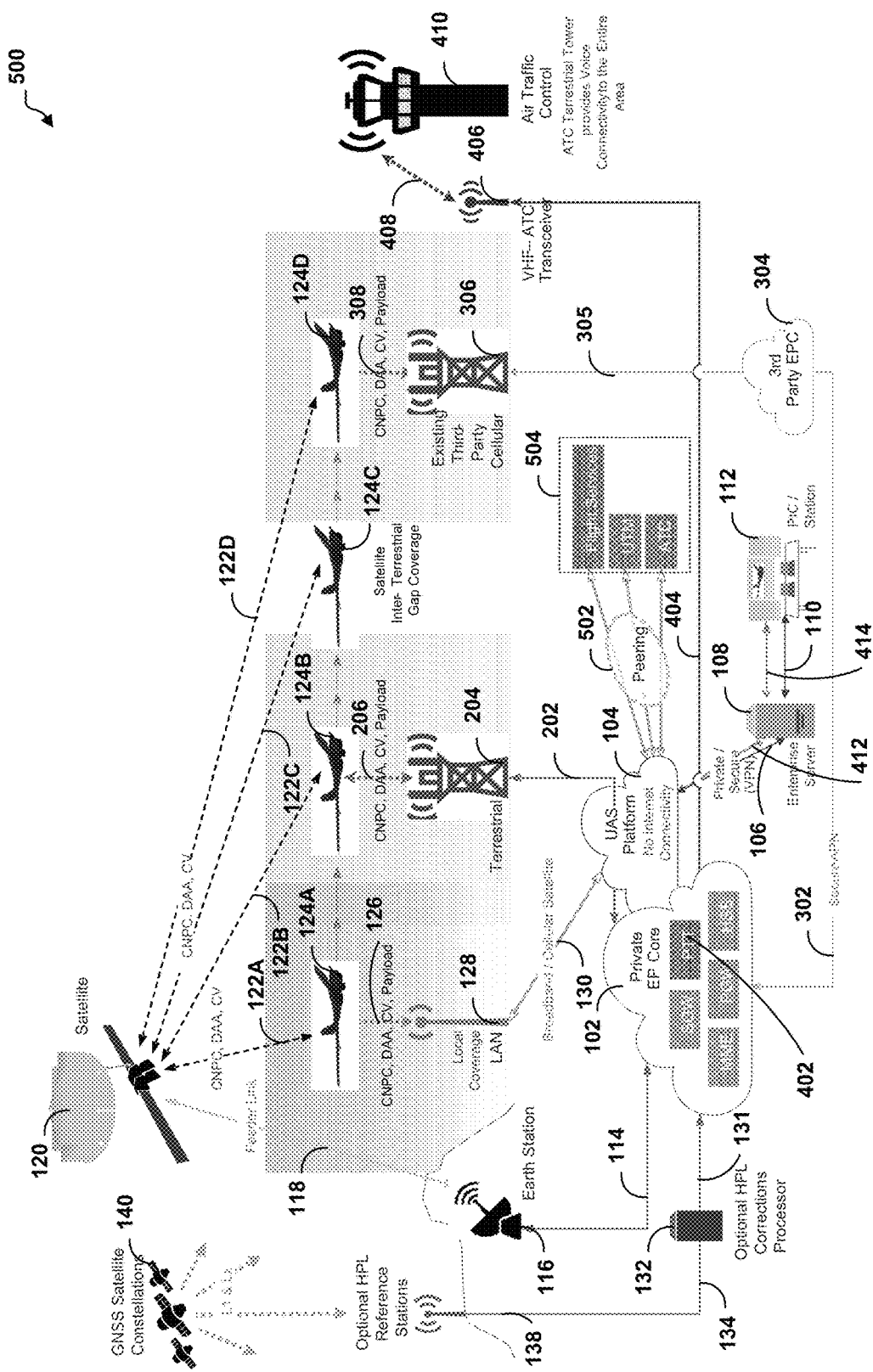
FIG. 5 is a diagram illustrating an unmanned aerial system (UAS) including a VHF-ATC transceiver and direct peering services for communication with an Air Traffic Control (ATC) terrestrial tower, in accordance with some embodiments.

FIG. 5 is a diagram illustrating an unmanned aerial system (UAS) 500 including the VHF-ATC transceiver 406 and direct peering services 504 for communication with an Air Traffic Control (ATC) terrestrial tower 410, in accordance with some embodiments. The UASs 100 through 500 have similar components and function similarly. Therefore, the description of the UASs 100 through 400 is a description that may be applied to the UAS 500. As a consequence, the components and functionality previously described above with respect to the UASs 100 through 400 are not described in greater detail. As illustrated in FIG. 5, the UAS 500 optionally includes the HPL corrections processor 132 and the HPL reference stations 138.

In the example of FIG. 5, the UAS 500 the user may relay telemetry information, flight plans, NOTAMS, or other suitable information to direct peering services 504 via secure peering connections 502. In some embodiments, the direct peering services 504 include flight services, UTM, and air traffic control.

Figure 6:
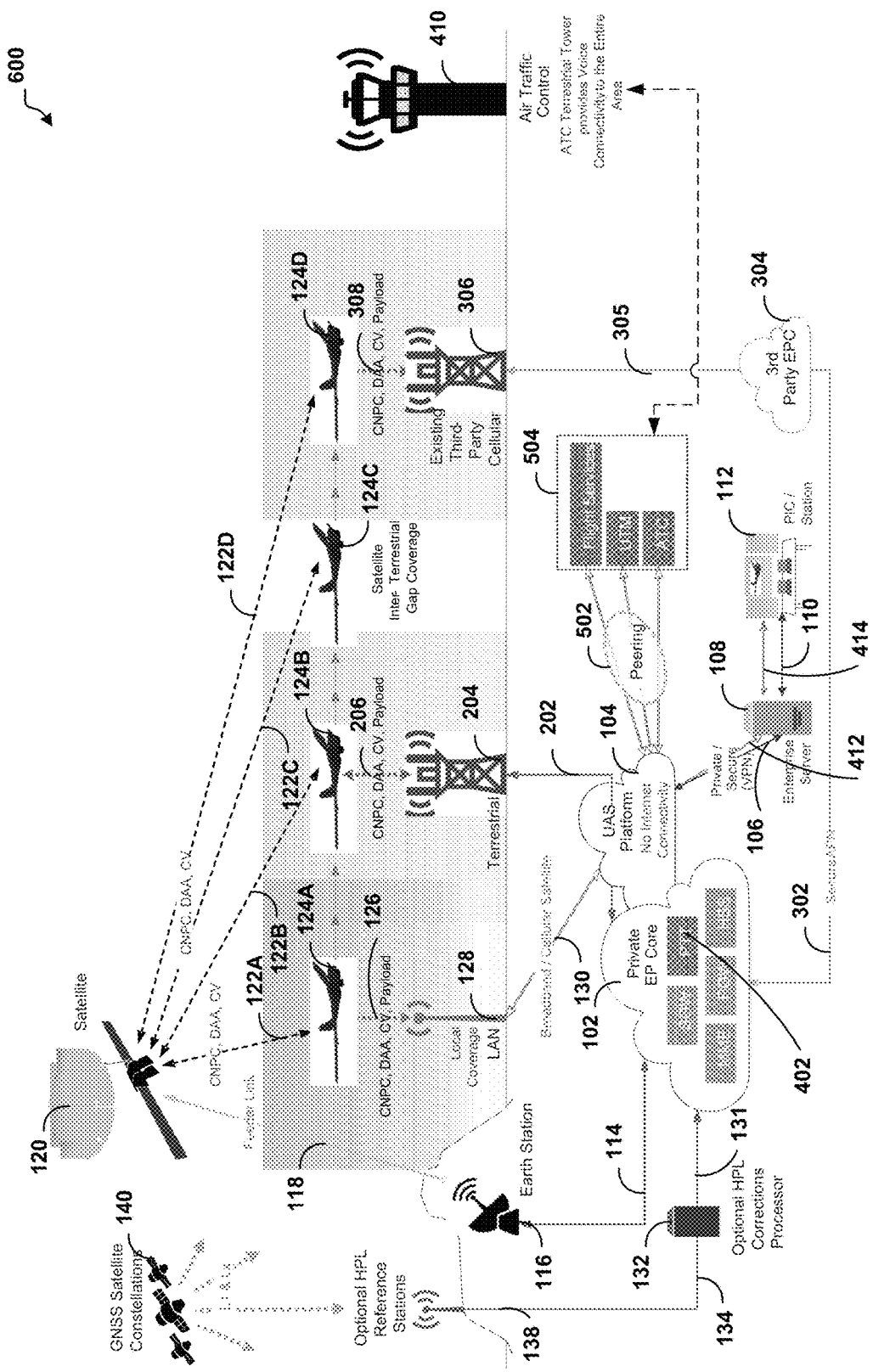
FIG. 6 is a diagram illustrating an unmanned aerial system (UAS) including direct peering services for communication with an Air Traffic Control (ATC) terrestrial tower, in accordance with some embodiments.

FIG. 6 is a diagram illustrating an unmanned aerial system (UAS) 600 including direct peering services 504 for communication with various national airspace supporting systems (for example, Air Traffic Control (ATC), Flight Services, NASA unmanned traffic management (UTM), and other unmanned service suppliers), in accordance with some embodiments. The UASs 100 through 600 have similar components and function similarly. Therefore, the description of the UASs 100 through 500 is a description that may be applied to the UAS 500. As a consequence, the components and functionality previously described above with respect to the UASs 100 through 500 are not described in greater detail. As illustrated in FIG. 6, the UAS 600 optionally includes the HPL corrections processor 132 and the HPL reference stations 138.

In the example of FIG. 6, the private EP core 102 also includes a push-to-talk service 402 that is available to the user of the PIC/Station 112. The push-to-talk service 402 is communicatively connected to the direct peering services 504 via the secure peering connections 502 and the enterprise server 108 via bi-directional communication link 412.

As illustrated in FIG. 6, the ATC terrestrial tower 410 transmits a voice communication to the unmanned aerial vehicle 124 (for example, the unmanned aerial vehicle 124D). The UAS platform 104 receives the voice communication from the direct peering services 504 via the secure peering connections 502. In some embodiments, the UAS platform 104 may receive the voice communication in parallel to a voice communication that is broadcast by the ATC terrestrial tower 410. In other embodiments, the ATC terrestrial tower 410 directly transmits the voice communication to the UAS platform 104 via the direct peering services 504 and the secure peering connections 502.

The push-to-talk service 402 of the private EP core 102 determines which unmanned aerial vehicles are located within range of the ATC terrestrial tower 410 by geo-fencing the unmanned aerial vehicle 124 using positioning information (for example, the high precision location information generated by the private EP core 102) and the ATC terrestrial tower 410. The push-to-talk service 402 relays the voice communication to the unmanned aerial vehicle 124 that is determined to be within range of the ATC terrestrial tower 410.

To relay the voice communication to the unmanned aerial vehicle 124 that is determined to be within range of the ATC terrestrial tower 410, the UAS platform 104 transmits the voice communication to the enterprise server 108 via the bi-directional communication link 412. The enterprise server 108 transmits the voice communication to PIC/Station 112 and the user via the bi-directional communication link 414.

The user may respond to the voice communication at the PIC/Station 112 to transmit a second communication (for example, a second voice communication) to the enterprise server 108 over the bi-directional communication link 414. The enterprise server 108 transmits the second communication to the UAS platform 104 via the bi-directional communication link 412. The push-to-talk service 402 receives the second communication from the UAS platform 104 and relays the second communication to the ATC terrestrial tower 410 via the secure peering connections 502 and the direct peering services 504.

For ease of understanding, FIG. 4 illustrates and describes a single VHF-ATC transceiver 406 and a single ATC terrestrial tower 410. However, the one-to-one correspondence may be applied to every ATC terrestrial tower in North America. For example, each ATC terrestrial tower (including the ATC terrestrial tower 410) in North America may be connected to the UAS platform 104 via the direct peering services 504 and the secure peering connections 502. The UAS platform 104 may also relay the voice communication to one or more enterprise servers that are operating one or more unmanned aerial vehicles that are determined to be within range of the ATC terrestrial tower.

Figure 7:
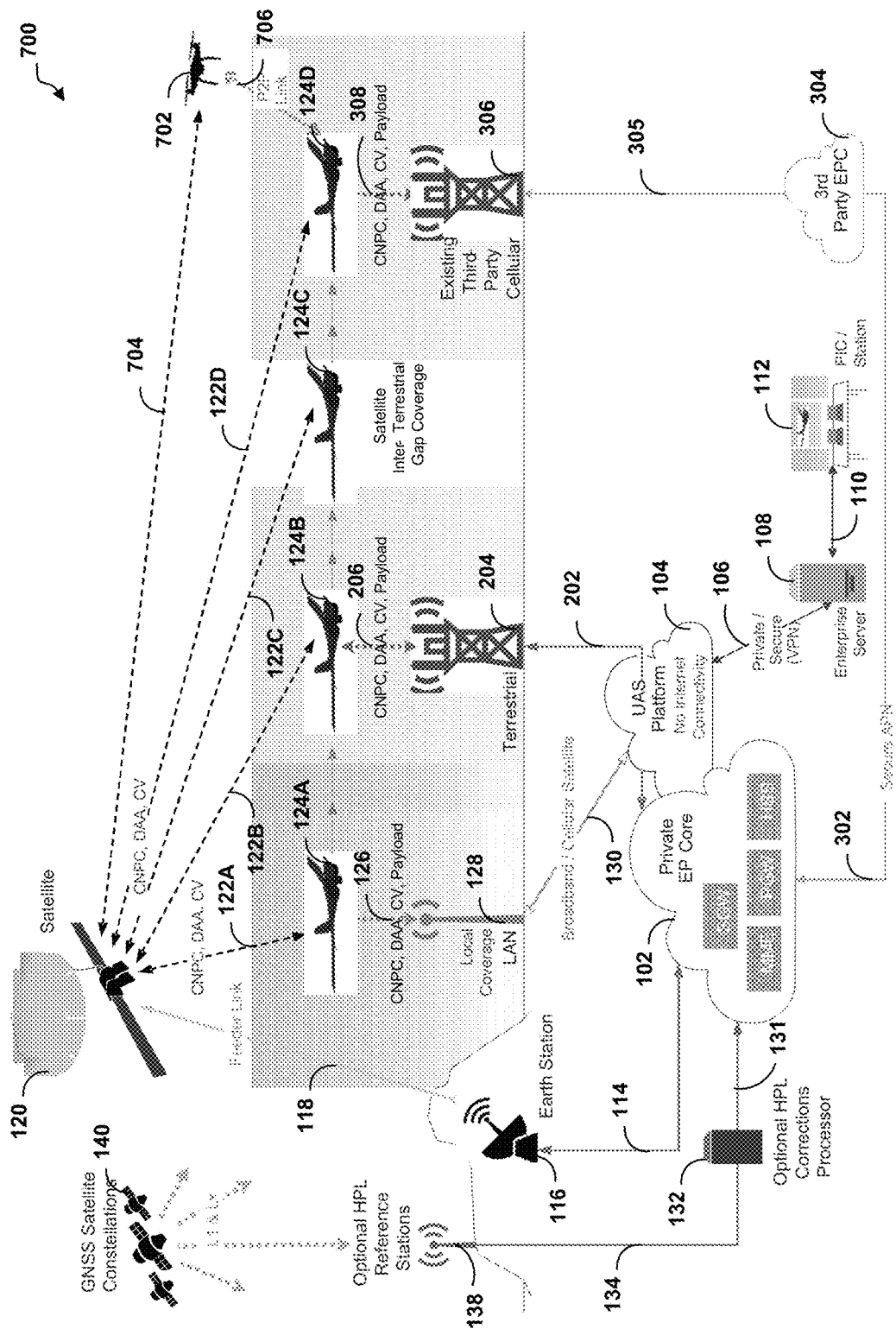
FIG. 7 is a diagram illustrating an unmanned aerial system (UAS) including a peer-to-peer link between two unmanned aerial vehicles, in accordance with some embodiments.

FIG. 7 is a diagram illustrating an unmanned aerial system (UAS) 700 including a peer-to-peer link 706 between two unmanned aerial vehicles 124D and 702, in accordance with some embodiments. The UASs 100 through 700 have similar components and function similarly. Therefore, the description of the UASs 100 through 600 is a description that may be applied to the UAS 700. As a consequence, the components and functionality previously described above with respect to the UASs 100 through 600 are not described in greater detail. As illustrated in FIG. 7, the UAS 700 optionally includes the HPL corrections processor 132 and the HPL reference stations 138.

In the example of FIG. 7, the UAS 700 includes a second unmanned aerial vehicle 702 in addition to the unmanned aerial vehicle 124. The second unmanned aerial vehicle 702 is communicatively connected to the satellite 120 via a bi-directional satellite communication link 702 (similar to the bi-directional satellite communication link 122 as described above) and the unmanned aerial vehicle 124 via a wireless peer-to-peer link 706. The wireless peer-to-peer link 706 may use licensed or unlicensed aviation spectrum. For example, the wireless peer-to-peer link 706 may use unlicensed aviation-designated spectrum with power restrictions.

As illustrated in FIG. 7, the second unmanned aerial vehicle 702 may receive information (for example, payload information, CNPC information, DAA information, the correction vector, or a combination thereof) from the UAS platform 104 via the unmanned aerial vehicle 124 and the wireless peer-to-peer link 706. For example, in some embodiments, when the second unmanned aerial vehicle 702 is in an inter-terrestrial gap or other extreme RF limitation (for example, a tunnel or a bridge), the second unmanned aerial vehicle 702 may still receive the information from the UAS platform 104 via the unmanned aerial vehicle 124 instead of a terrestrial network. Additionally, the second unmanned aerial vehicle 702 may transmit the peer-to-peer messages to the PIC/Station 112 via the satellite 120, the local area network 126, the terrestrial network 206, the third-party existing cellular network 308, or a combination thereof.

Advantages of the UAS 700 include, among other things, peer-to-peer connectivity between a plurality of unmanned aerial vehicles that improves on overall safe integration by delivering intent between the plurality of unmanned aerial vehicles for enhanced autonomous operation (for example, enhanced detect and avoid). Another advantage of the UAS 700 is the peer-to-peer connectivity may be used as an alternative to ADS-B In/Out. Another advantage may be found in the addition of air-to-ground communications for an alternative to ADS-B rebroadcast. Specifically, a wireless data link that is separate from ADS-B rebroadcast, the wireless data link is transmitted from the UAS to a ground station similar to a ADS-B rebroadcast, but on a different frequency to reduce congestion in the ADS-B spectrum. Another advantage is an ability to introduce swarming techniques for security and mission control. Yet another advantage is situational awareness.

Figure 8:
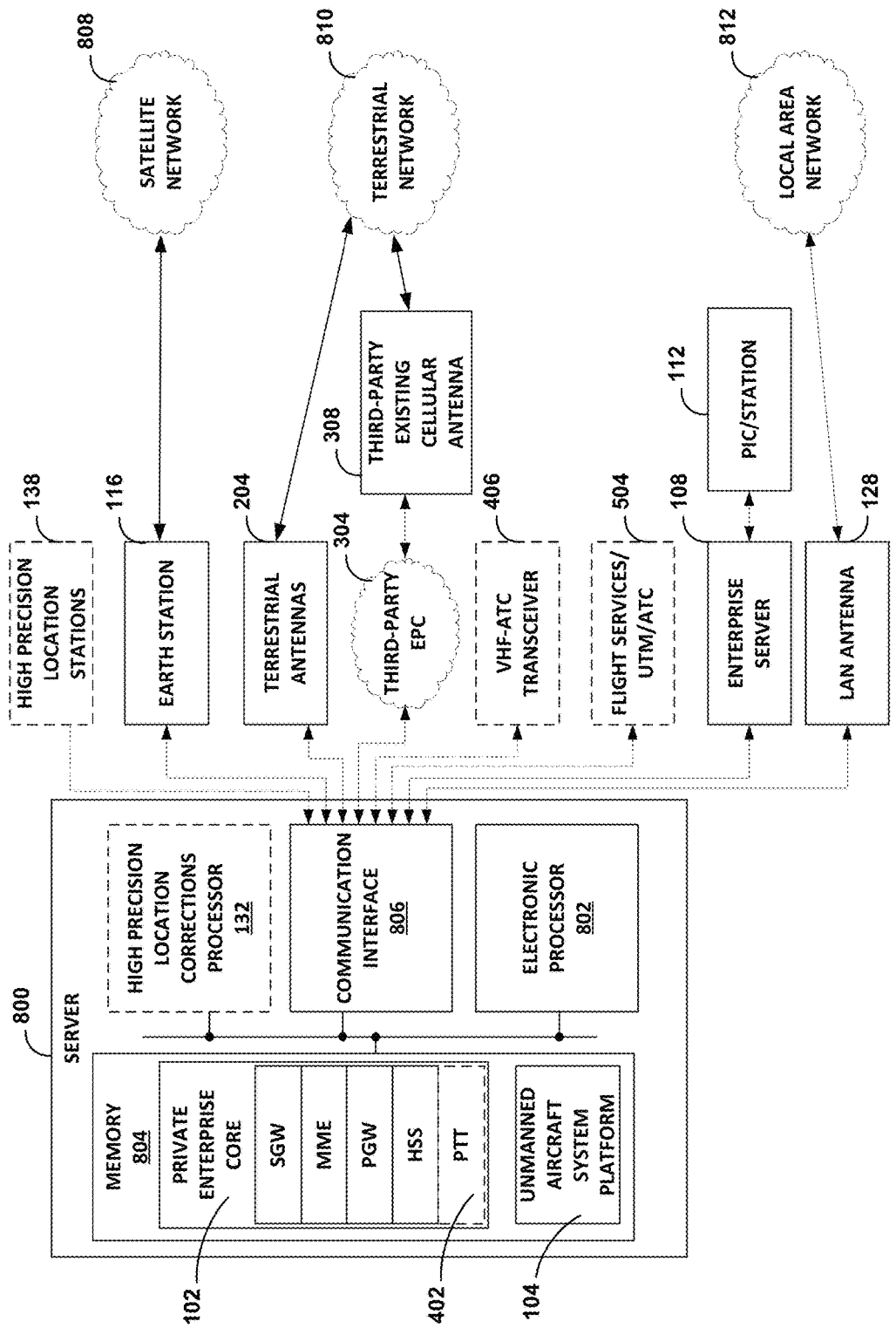
FIG. 8 is a block diagram illustrating a server operating a private enterprise (EP) core of FIGS. 1-7, in accordance with some embodiments.

FIG. 8 is a block diagram illustrating a server 800 operating the private enterprise core 102, in accordance with some embodiments. In the example of FIG. 8, the server 800 includes an electronic processor 802 (for example, a microprocessor or another suitable processing device), a memory 804 (for example, a non-transitory computer-readable storage medium), a communication interface 806, and the optional high precision location corrections processor 132 (optionality indicated by dashed lines) as described above. It should be understood that, in some embodiments, the server 800 may include fewer or additional components in configurations different from that illustrated in FIG. 8. Also the server 800 may perform additional functionality than the functionality described herein. In addition, the functionality of the server 800 may be incorporated into one or more of the plurality of unmanned aerial vehicles, other servers, or a combination thereof. As illustrated in FIG. 8, the electronic processor 802, the memory 804, the communication interface 806, and the optional high precision location corrections processor 132 are electrically coupled by one or more control or data buses enabling communication between the components.

The memory 804 may include a program storage area (for example, read only memory (ROM)) and a data storage area (for example, random access memory (RAM), and other non-transitory, machine-readable medium). In some examples, the program storage area may store the instructions regarding the SGW service, the MME service, the PGW service, the HSS service, and the optional push-to-talk service 402. Additionally, the program storage may store the instructions regarding the unmanned aerial system (UAS) platform 104. In some examples, the data storage area of the memory 804 may store the CNPC information, DAA information, payload information, and the correction vector as described above. The UAS platform 104 captures every transaction of data between the UAS and the Pilot Control Station. In other words, the UAS platform 104, among other things, is a virtual "black box" that stores information of the mission. The information of the mission that is stored by the UAS platform 104 may be rebroadcast and shared with Air Traffic Control, Flight Services, and/or UTM. The rebroadcast of the information may be in real time, near real time, or later as needed to support the application.

The electronic processor 802 executes machine-readable instructions stored in the memory 804. For example, the electronic processor 802 may execute instructions stored in the memory 804 to perform the functionality described above.

The communication interface 806 receives data from and provides data to devices external to the server 800, such as the optional high precision location references stations 138, the earth station 116, the terrestrial antennas 204, the optional third-party enterprise core 304 and optional third-party existing cellular antenna 306, the optional VHF-ATF transceiver 406, the optional direct peering services 504, the enterprise server 108 and the PIC/Station 112, and the optional LAN antenna 128. For example, the communication interface 806 may include a port or connection for receiving a wired connection (for example, an Ethernet cable, fiber optic cable, a telephone cable, or the like), a wireless transceiver, or a combination thereof.

In some examples, the server 800 may include one or more optional user interfaces (not shown). The one or more optional user interfaces include one or more input mechanisms (for example, a touch screen, a keypad, a button, a knob, and the like), one or more output mechanisms (for example, a display, a printer, a speaker, and the like), or a combination thereof. The one or more optional user interfaces receive input from a user, provide output to a user, or a combination thereof. In some embodiments, as an alternative to or in addition to managing inputs and outputs through the one or more optional user interfaces, the server 800 may receive user input, provide user output, or both by communicating with an external device, such as a console computer, over a wired or wireless connection (for example, through the communication interface 806).

As illustrated in FIG. 8, the server 800 communicates with one or more unmanned aerial vehicles via the earth station 116 and the satellite network 808. Components of the satellite network 808 including the satellite 120 and the satellite bi-directional communication link 122 as described above.

Additionally, in parallel to the satellite communication, in some examples, the server 800 communicates with the one or more unmanned aerial vehicles via the terrestrial network 810. Components of the terrestrial network 810 may include the terrestrial antennas 204 and 210, the third-party EPC 304 and the third-party existing cellular antenna 306, or some combination thereof, as described above.

Additionally or alternatively, in parallel to the satellite communication, in other examples, the server 800 communicates with the one or more unmanned aerial vehicles via the local area network 812. Components of the local area network 812 include the LAN antenna 128 as described above.

Figure 9:
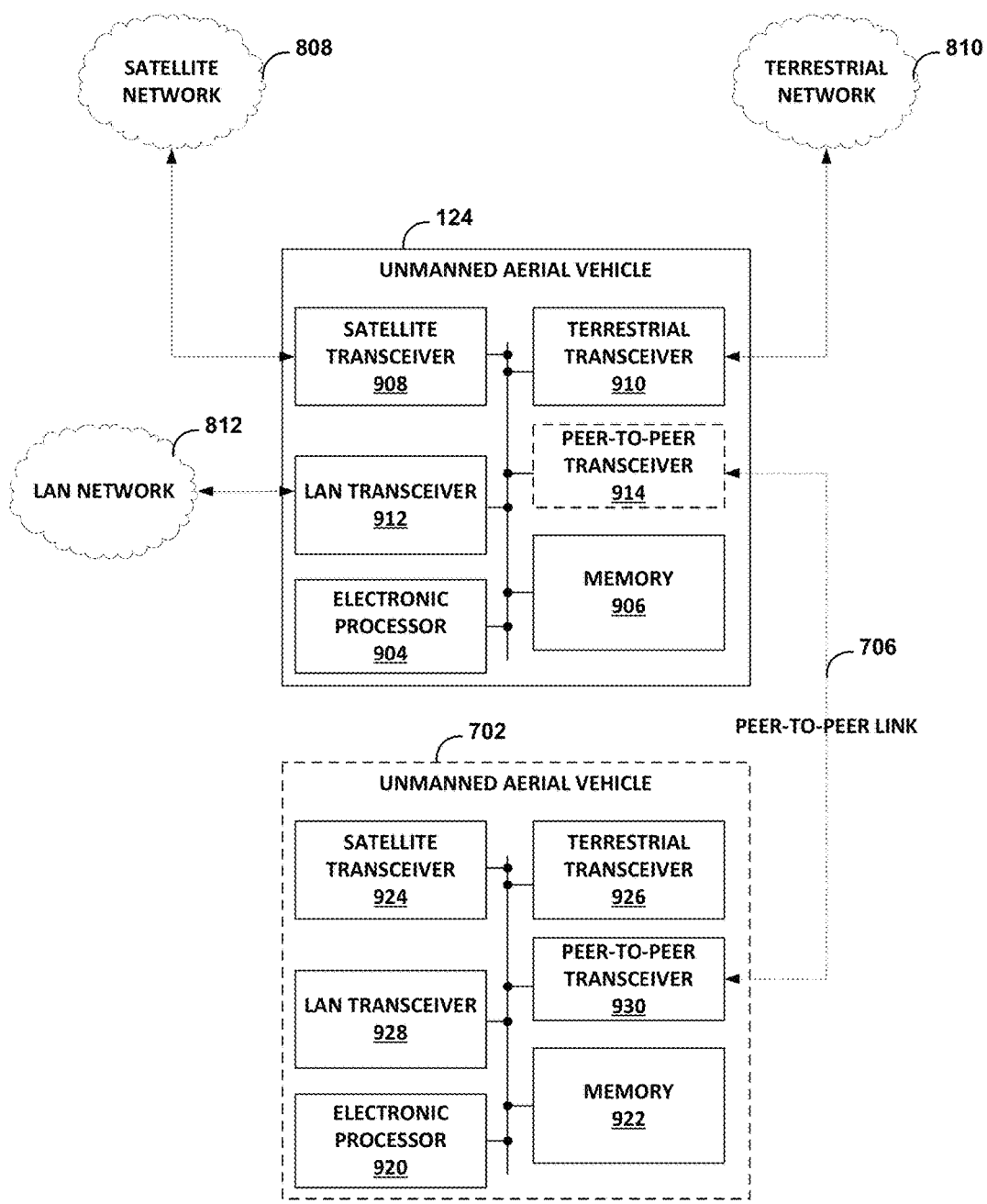
FIG. 9 is a block diagram illustrating an unmanned aerial vehicle of FIGS. 1-7 and an optional second unmanned aerial vehicle of FIG. 7, in accordance with some embodiments.

FIG. 9 is a block diagram illustrating the unmanned aerial vehicle 124 of the unmanned aerial systems 100-700 and the optional second unmanned aerial vehicle 702, in accordance with some embodiments.

The unmanned aerial vehicle 124 includes an electronic processor 904 (for example, a microprocessor or another suitable processing device), a memory 906 (for example, a non-transitory computer-readable storage medium), a satellite transceiver 908, a terrestrial transceiver 910, a local area network (LAN) transceiver 912, and an optional peer-to-peer transceiver 914 (optionality indicated by dashed lines). As illustrated in FIG. 9, the unmanned aerial vehicle 124 is communicatively connected to the satellite network 808, the terrestrial network 180, the local area network 812, or some combination thereof, with the satellite transceiver 908, the terrestrial transceiver 910, and the LAN transceiver 912, respectively. Further, as illustrated in FIGS. 8 and 9, the local area network 812 is illustrated and referred to separately from the terrestrial network 810. However, in some examples, the local area network 812 and the terrestrial network 810 may be considered to be part of a larger "terrestrial" network that includes all networks physically located on or relating to the terrain of the Earth (i.e., the local area network, the terrestrial network, the third-party cellular network, or some combination thereof, as described above) versus a "satellite" network that is not located on or relating to the terrain of the Earth.

It should be understood that, in some embodiments, the unmanned aerial vehicle 124 may include fewer or additional components in configurations different from that illustrated in FIG. 9. Also, the unmanned aerial vehicle 124 may perform additional functionality than the functionality described herein. In addition, the functionality of the unmanned aerial vehicle 124 may be incorporated into other unmanned aerial vehicles, other servers, or a combination thereof. As illustrated in FIG. 9, the electronic processor 904 (for example, a baseband processor, a digital signal processor, a microprocessor, or other suitable processor), the memory 906 (for example, a non-transitory computer-readable medium), the satellite transceiver 908 including a satellite modem, the terrestrial transceiver 910 including a fourth generation (4G) modem or a fifth generation (5) modem, the local area network (LAN) transceiver 912 including a LAN modem, and the optional peer-to-peer transceiver 914 are electrically coupled by one or more control or data buses enabling communication between the components. The unmanned aerial vehicle 124 also may include an air-to-ground radio.

Some or all of the components described above with respect to the unmanned aerial vehicle 124 may be tied to an application manager. In some embodiments, the application manager manages a communication application by automatically assigning, individually or together, communication links by best service class to some or all of the components described above. Additionally or alternatively, the communication links assigned to some or all of the components described above may be managed manually by the pilot. Additionally or alternatively, the application manager may also manage other applications, including, for example, an avionics application, a payload application, a geo-fencing application, a GPS application, and/or a high precision location application.

The optional second unmanned aerial vehicle 702 includes an electronic processor 920 (for example, a baseband processor, a digital signal processor, a microprocessor, or other suitable processing device), a memory 922 (for example, a non-transitory computer-readable storage medium), a satellite transceiver 924, a terrestrial transceiver 926, a local area network (LAN) transceiver 928, and an optional peer-to-peer transceiver 930 (optionality indicated by dashed lines). As illustrated in FIG. 9, the optional second unmanned aerial vehicle 702 is communicatively connected to the unmanned aerial vehicle 124 via the peer-to-peer transceivers 914 and 930 and the peer-to-peer link 706.

It should be understood that, in some embodiments, the optional second unmanned aerial vehicle 702 may include fewer or additional components in configurations different from that illustrated in FIG. 9. Also, the optional second unmanned aerial vehicle 702 may perform additional functionality than the functionality described herein. In addition, the functionality of the optional second unmanned aerial vehicle 702 may be incorporated into other unmanned aerial vehicles, other servers, or a combination thereof. As illustrated in FIG. 9, the electronic processor 920, the memory 922, the satellite transceiver 924, the terrestrial transceiver 926, the local area network (LAN) transceiver 928, and the optional peer-to-peer transceiver 930 are electrically coupled by one or more control or data buses enabling communication between the components.

Figure 10:
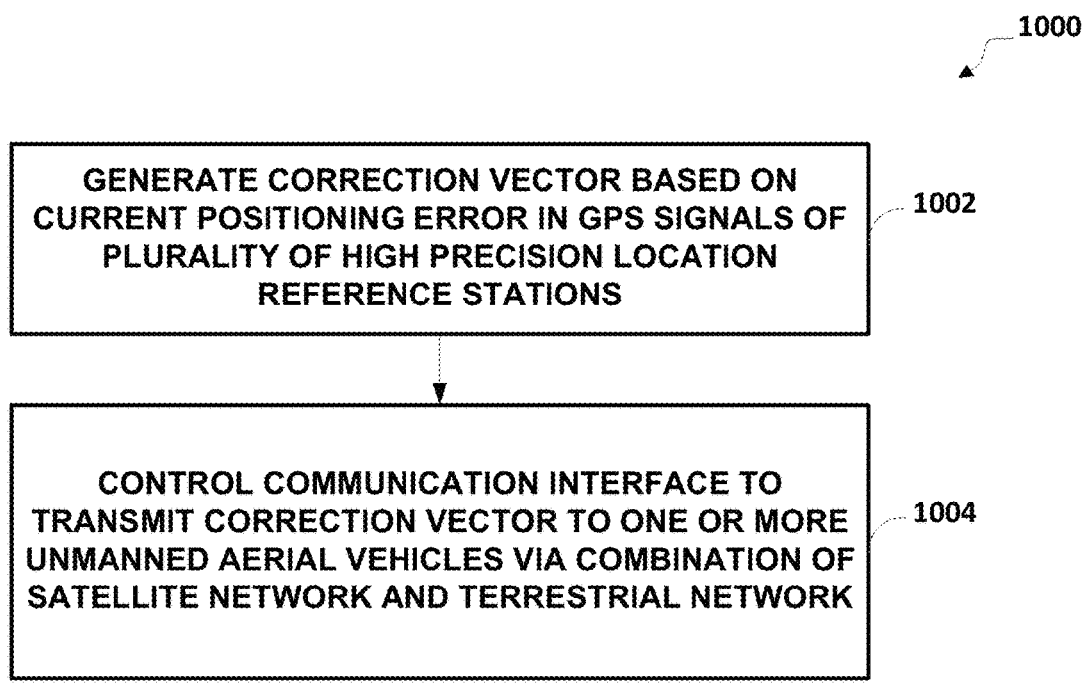
FIG. 10 is a flowchart illustrating a method for communicating a correction vector to an unmanned aerial vehicle of FIGS. 1-7 via a satellite network and a terrestrial network, in accordance with some embodiments.

FIG. 10 is a flowchart illustrating a method 1000 for communicating a correction vector to an unmanned aerial vehicle 124 of FIGS. 1-7 via a satellite network and a terrestrial network, in accordance with some embodiments. FIG. 10 is described with respect to the server 800 of FIG. 8.

The method 1000 includes generating, with the electronic processor 802, a correction vector based on a current positioning error in GPS signals of a plurality of high precision reference stations (at block 1002). In some examples, the private EP core 102 receives GPS signals from a plurality of high precision reference stations and generates the correction vector from the GPS signals that are received.

The method 1000 also includes controlling, with the electronic processor 802, the communication interface 806 to transmit the correction vector to the unmanned aerial vehicle 124 via a combination of the satellite network 808 and the terrestrial network 810 (at block 1004).

Additionally, in some embodiments, the method 1000 also includes receiving GPS signals from the unmanned aerial vehicle 124 and generating HPL information regarding the unmanned aerial vehicle 124 with the correction vector. The HPL information includes a geographical position of the unmanned aerial vehicle 124 and the precision of the geographical position is within ten centimeters.

Thus, the present disclosure provides, among other things, unmanned aerial systems. Various features and advantages of the present disclosure are set forth in the following claims.

What is claimed is:

1. A server comprising:
    a communication interface;
    a memory; and
        an electronic processor communicatively connected to the memory, the electronic processor configured to
        communicate with one or more unmanned aerial vehicles via the communication interface and a satellite network,
        communicate with the one or more unmanned aerial vehicles via the communication interface and a terrestrial network,
        communicate with the one or more unmanned aerial vehicles via the communication interface and a combination of the satellite network and the terrestrial network,
        transmit a voice communication to a VHF-ATC transceiver via the communication interface,
        control the VHF-ATC transceiver to transmit the voice communication to an Air Traffic Control (ATC) tower,
        receive an input that indicates a selection of one of the one or more unmanned aerial vehicles, and
        select the VHF-ATC transceiver from a plurality of VHF-ATC transceivers by executing a push-to-talk program stored in the memory and based on the input,
        wherein the push-to-talk program includes a database containing a geographical location of each of the plurality of VHF-ATC transceivers, and
        wherein the electronic processor selects the VHF-ATC transceiver with the geographical location that is closest to a geographical position of the one of the one or more unmanned aerial vehicles.

2. The server of claim 1, wherein the electronic processor is further configured to
    receive GPS signals from a plurality of high precision reference stations via the communication interface, determine a current positioning error in the GPS signals, and generate a correction vector based on the current positioning error.

3. The server of claim 2, wherein, to communicate with the one or more unmanned aerial vehicles via the communication interface and the terrestrial network, the electronic processor is further configured to output the correction vector to a local-area-network (LAN) antenna via the communication interface, and control the LAN antenna to transmit the correction vector to the one or more unmanned aerial vehicles.

4. The server of claim 2, wherein, to communicate with the one or more unmanned aerial vehicles via the communication interface and the combination of the satellite network and the terrestrial network, the electronic processor is further configured to output the correction vector to at least one of an earth station or a local-area-network (LAN) antenna via the communication interface, control the earth station to transmit the correction vector to a satellite, control the satellite to transmit the correction vector to the one or more unmanned aerial vehicles, and control the LAN antenna to transmit the correction vector to the one or more unmanned aerial vehicles.

5. The server of claim 2, wherein, to communicate with the one or more unmanned aerial vehicles via the communication interface and the combination of the satellite network and the terrestrial network, the electronic processor is further configured to output the correction vector to at least one of an earth station or one or more terrestrial antennas via the communication interface, control the earth station to transmit the correction vector to a satellite, control the satellite to transmit the correction vector to the one or more unmanned aerial vehicles, and control the one or more terrestrial antennas to transmit the correction vector to the one or more unmanned aerial vehicles.

6. The server of claim 2, wherein, to communicate with the one or more unmanned aerial vehicles via the communication interface and the terrestrial network, the electronic processor is further configured to output the correction vector to a third-party enterprise server via the communication interface, and request transmission of the correction vector to the one or more unmanned aerial vehicles via a third-party cellular network that is operated by the third-party enterprise server.

7. The server of claim 1, wherein the electronic processor is further configured to communicate directly with peering services via secure peering connections established by the communication interface, and wherein the peering services include at least one of Air Traffic Control (ATC), Flight Services, or Unmanned Traffic Control (UTM).

8. The server of claim 1, wherein the electronic processor is further configured to control the one or more unmanned aerial vehicles to establish a peer-to-peer connection with a second one or more unmanned aerial vehicles, and control the one or more unmanned aerial vehicles to communicate information to the second one or more unmanned aerial vehicles via the peer-to-peer connection.

9. A system comprising:

a plurality of VHF-ATC transceivers including a VHF-ATC transceiver, an Air Traffic Control (ATC) tower;

one or more unmanned aerial vehicles; and a server comprising:

a communication interface, a memory, and an electronic processor communicatively connected to the memory, the electronic processor configured to communicate with the one or more unmanned aerial vehicles via the communication interface and a satellite network, communicate with the one or more unmanned aerial vehicles via the communication interface and a terrestrial network, communicate with the one or more unmanned aerial vehicles via the communication interface and a combination of the satellite network and the terrestrial network, transmit a voice communication to the VHF-ATC transceiver via the communication interface, control the VHF-ATC transceiver to transmit the voice communication to the ATC tower, receive an input that indicates a selection of one of the one or more unmanned aerial vehicles, and select the VHF-ATC transceiver from the plurality of VHF-ATC transceivers by executing a push-to-talk program stored in the memory and based on the input, wherein the push-to-talk program includes a database containing a geographical location of each of the plurality of VHF-ATC transceivers, and wherein the electronic processor selects the VHF-ATC transceiver from the plurality of VHF-ATC transceivers based on the geographical location that is closest to a geographical location of the one of the one or more unmanned aerial vehicles.

10. The system of claim 9, further comprising a plurality of high precision reference stations, wherein the electronic processor is further configured to receive GPS signals from the plurality of high precision reference stations via the communication interface, determine a current positioning error in the GPS signals, and generate a correction vector based on the current positioning error.

11. The system of claim 10, further comprising a local-area-network (LAN) antenna, wherein, to communicate with the one or more unmanned aerial vehicles via the communication interface and the terrestrial network, the electronic processor is further configured to output the correction vector to the LAN antenna via the communication interface, and control the LAN antenna to transmit the correction vector to the one or more unmanned aerial vehicles.

12. The system of claim 10, further comprising:

an earth station;

a local-area-network (LAN) antenna; and a satellite, wherein, to communicate with the one or more unmanned aerial vehicles via the communication interface and the combination of the satellite network and the terrestrial network, the electronic processor is further configured to output the correction vector to at least one of the earth station or the local-area-network (LAN) antenna via the communication interface, control the earth station to transmit the correction vector to the satellite, control the satellite to transmit the correction vector to the one or more unmanned aerial vehicles, and control the LAN antenna to transmit the correction vector to the one or more unmanned aerial vehicles.

13. The system of claim 10, further comprising:

an earth station;

one or more terrestrial antennas; and a satellite, wherein, to communicate with the one or more unmanned aerial vehicles via the communication interface and the combination of the satellite network and the terrestrial network, the electronic processor is further configured to output the correction vector to at least one of the earth station or the one or more terrestrial antennas via the communication interface, control the earth station to transmit the correction vector to the satellite, control the satellite to transmit the correction vector to the one or more unmanned aerial vehicles, and control the one or more terrestrial antennas to transmit the correction vector to the one or more unmanned aerial vehicles.

14. The system of claim 10, further comprising:

a third-party enterprise server; and a third-party cellular network that is operated by the third-party enterprise server, wherein, to communicate with the one or more unmanned aerial vehicles via the communication interface and the terrestrial network, the electronic processor is further configured to output the correction vector to the third-party enterprise server via the communication interface, and request transmission of the correction vector to the one or more unmanned aerial vehicles via the third-party cellular network.

15. A method comprising:

receiving, with an electronic processor, an input that indicates a selection of one of one or more unmanned aerial vehicles;

selecting, with the electronic processor, a VHF-ATC transceiver from a plurality of VHF-ATC transceivers by executing a push-to-talk program stored in a memory and based on the input, wherein the push-to-talk program includes a database containing a geographical location of each of the plurality of VHF-ATC transceivers, and wherein selecting the VHF-ATC transceiver from the plurality of VHF-ATC transceivers by executing the push-to-talk program further includes selecting the VHF-ATC transceiver with the geographical location that is closest to a geographical position of the one of the one or more unmanned aerial vehicles;

controlling, with the electronic processor, a communication interface to transmit a voice communication to the VHF-ATC transceiver with the geographical location that is closest to the geographical position of the one of the one or more unmanned aerial vehicles; and controlling the VHF-ATC transceiver to transmit the voice communication to an Air Traffic Control (ATC) tower.

* * * * *